United States Patent [19]

Bina

[11] Patent Number: 5,077,630
[45] Date of Patent: Dec. 31, 1991

[54] INTEGRATED SERVICES DIGITAL NETWORK TERMINATING RESISTOR WITH LINE FAULT PROTECTOR

[75] Inventor: Dale C. Bina, Wheaton, Ill.

[73] Assignee: Delta Design and Development Co., Wheaton, Ill.

[21] Appl. No.: 500,709

[22] Filed: Mar. 28, 1990

[51] Int. Cl.$^5$ .............................................. H02H 9/00
[52] U.S. Cl. .................................... 361/119; 361/106; 379/331; 379/412
[58] Field of Search ................... 361/87, 97, 103, 106, 361/119, 111, 117, 118; 379/331, 412, 24, 30, 394, 398, 403, 404; 439/620; 330/20, 22 R, 220

[56] References Cited

U.S. PATENT DOCUMENTS

| | | | |
|---|---|---|---|
| 3,750,082 | 7/1973 | Petersen et al. | 338/220 |
| 4,225,210 | 9/1980 | Haag et al. | 339/258 R |
| 4,313,147 | 1/1982 | Uchida et al. | 361/119 |
| 4,433,212 | 2/1984 | Moses et al. | 179/2 C |
| 4,438,477 | 3/1984 | Cawley | 361/119 |
| 4,475,012 | 10/1984 | Coulmance | 179/81 R |
| 4,586,104 | 4/1986 | Standler | 361/119 X |
| 4,726,638 | 2/1988 | Farrar et al. | 439/620 |
| 4,729,752 | 3/1988 | Dawson, Jr. et al. | 439/620 |
| 4,742,541 | 5/1988 | Cwirzen et al. | 379/412 |
| 4,758,921 | 7/1988 | Hung | 361/119 |
| 4,772,225 | 9/1988 | Ulery | 439/620 |
| 4,799,901 | 1/1989 | Pirc | 439/620 |
| 4,862,311 | 8/1989 | Rust et al. | 439/620 |

OTHER PUBLICATIONS

"ISDN An Introduction" by William Stallings, 1989 pp. 285–287, MacMillan Publishing Co.
"DMS-100 ISDN Implementation" By Northern Telecom 50041.05/01-89 Issue 4, 3/34/89, pp. 35–44.
"NIC & PTC Thermistors and Prove Assemblies" a product catalog, by Keystone Carbon Co. 1984, pp. 33–42.
ISDN 7505 Modular Terminal, "7560 Display Terminal Users Manual" by AT&T, 51TG/0100/01e, Issue a Feb. 1989, pp. 23–24.
"5ESS Switch, ISDN Customer Premises Planning Guide" by AT&T, 51PG/0100/01e, Issue a, Feb. 1989 pp. 11–13, 24, 34–37.
"5ESS Switch, ISDN Customer Premises Planning Guide" by AT&T, 533-700-100, Issue 2, Dec. 1988 pp. 19–22, 64, 69.
"ISDN T-Interface Line Card" by Northern Telecom, A marketing Bulletin, 50181.03/06-89 Issue 1. 3 pp.
"ISDN Overall Newtork Aspects and Functions, by CCITT International Telegraph & Telephone Consultive Committee" vol. III Fascicle III.8, Recommendations I.310–I.470, Melbourne, Nov., 1988, Geneva 1989. pp. 194 Section 8.4 194, 1Xth Plenary Assembly.

*Primary Examiner*—A. D. Pellinen
*Assistant Examiner*—Jeffery A. Gaffin
*Attorney, Agent, or Firm*—Patula & Associates

[57] ABSTRACT

An integrated services digital network terminator for use in an ISDN network and assosicated peripheral apparatus comprised of a first electricl connector in electrical communication with a intergrated services digital network. A second electrical connector in electrical communication with the first end of a positive temperature coefficient thermistor and the second end of a positive temperature coefficient thermistor in electrical communication with the peripheral of a integrated services digital network. The thermistor thereby preserves the termination function of the network for in fault and no fault conditions. diagnostic purposes.

13 Claims, 3 Drawing Sheets

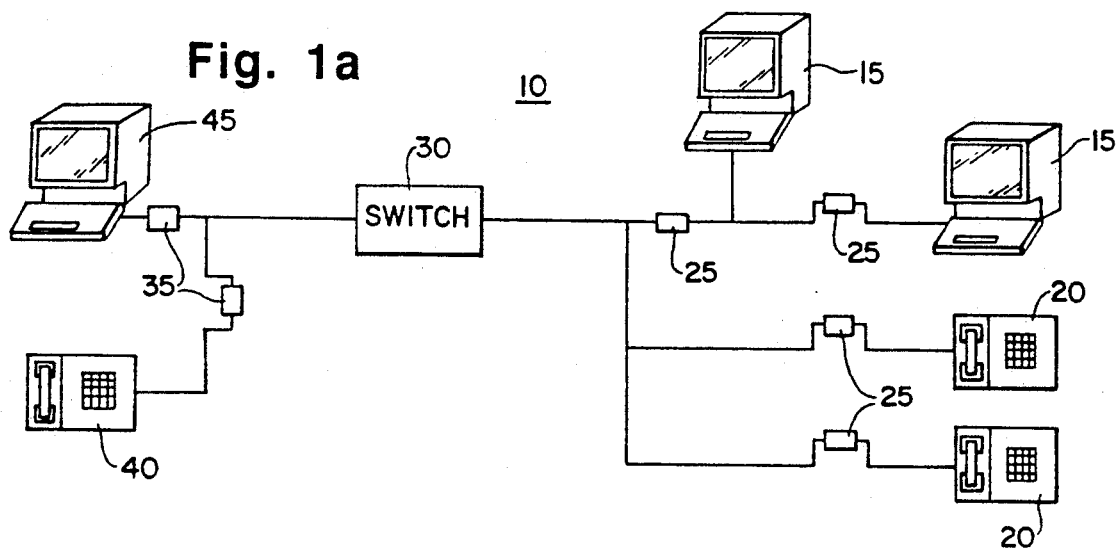
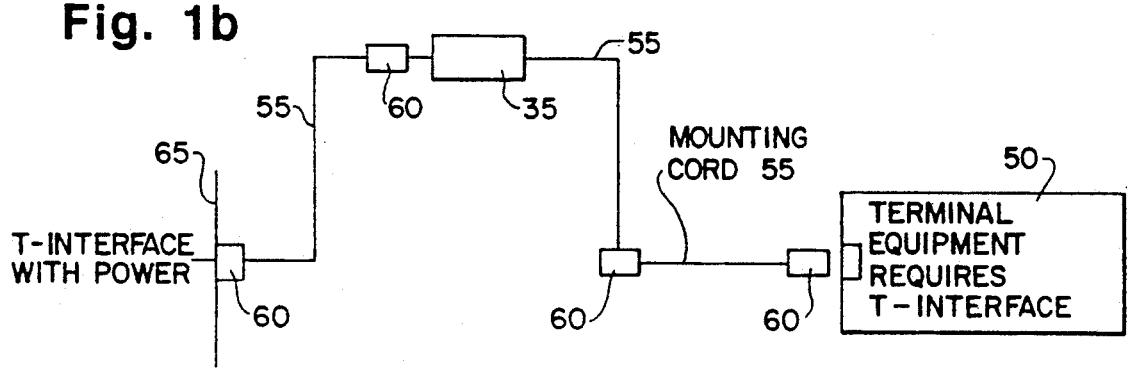
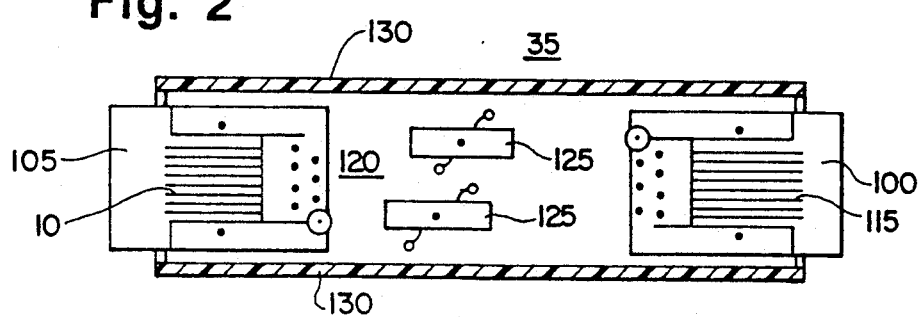

INTEGRATED SERVICES DIGITAL NETWORK TERMINATING RESISTOR WITH LINE FAULT PROTECTOR

FIELD OF THE INVENTION

This invention relates to electrical terminators, connectors and adapters designed to provide filtering and transient line fault protection against overcharge/overvoltage fault conditions for telecommunications networks utilizing integrated services digital network (ISDN) standards.

BACKGROUND OF THE INVENTION

Electrical circuitry has always been vulnerable to damage caused by power surges due to electrostatic discharges (ESD) and/or electromagnetic pulses (EMP) or electromagnetic interference (EMI). Therefore terminators have been developed which serve to either filter these high energy conditions or to burn out and not allow any voltage to pass when surge conditions occur.

These adapters have been modified and updated as the state of the art of electrical circuits has changed. In the telecommunications field, with the advent of the new ISDN standards, it is again necessary to develop new equipment.

The ISDN terminator of the present invention is a small but, necessary part of the overall network. The terminator provides a 100 ohm bus termination function for each tap on the network. This termination allows each tap to be tested by the system, whether or not a customer is connected. If this termination is not seen by the system, trouble is suspected and the networks integrity could be compromised.

Conventional analog telecommunications systems have been utilized to send a wide variety of types of data: voice, video, written words, through facsimile, and computer communications. However, it has always been necessary to use separate lines for each type of communication. In the case of computer communications, a modem or conversion routine are also necessary for the transfer. ISDN is a limited set of standard interfaces to a digital communication network. The new ISDN standards utilize digital signals and will allow the transfer of more than one type of data along the same phone line. Modems will no longer be necessary and facsimile transmissions can be accomplished from the user's desk top computer. An ISDN network will provide end users with voice, data and certain image services on end to end digital circuits, using an international standard for interfaces that is accepted by communication carriers, users and systems manufacturers. The ISDN is based on the development of digital transmission and switching technologies and their use to construct an integrated digital network for telecommunication.

The switch-over from conventional telecommunications methods to ISDN has been hampered in part due to the need to develope entirely new equipment to handle the digital transmissions. This equipment will link all users into a large network via their telecommunications carrier. One essential piece of equipment to this network is a termination resistor primarily and secondarily termination for line fault protector to protect the integrity of the network if one network tap is experiencing electrical overvoltage/overcurrent conditions. Without such protection the entire network could be jeopardized. The present invention is such a device. Its importance cannot be overlooked.

In addition to providing this termination function; it would also be desirable for the package that includes the termination resistor to provide some protection from overcurrent/overvoltage fault conditions. This can be accomplished in a number of ways with varying degrees of effectiveness. For example, a fuse offers some protection, but too slow to be really effective over a reasonable range of fault conditions, and leaves the network unterminated if blown.

A capacitor offers some protection over a narrow range of fault conditions, but it is slow and can fail short, jeopardizing the network and user's equipment.

A transistor is effective over a narrow range of operating and fault conditions with unpredictable failure mode under fault conditions, i.e., could fail short or open.

A thermistor as used in the present invention is effective over a wide range of conditions providing quick, proportionally measured response to applied fault conditions, returning to normal operation when the fault condition is removed. Under extreme conditions such as a lightning bolt, the unit could fail open, and not short. Although electrical adapters which protect equipment from electrical surge conditions are known in the art, none of these previously developed adapters will function in an ISDN system. ISDN transmits a multitude of various types of data (voice, digital data) simultaneously, the electrical connection or line characteristics involved, primarily reflections must be eliminated so as to not affect the operation of the network. Previous terminator/resistor protection type devices used in pre-ISDN applications do not perform the same function as the present invention and do not provide the same protection to the network or user's peripherals. No known devices will handle the ISDN protocol with both surge protection and network termination.

For example, U.S. Pat. No. 4,799,901 to Pirc discloses a line fault protector for a conventional four wire phone line connection system for use with a modem. This device utilizes surface mounted bi-polar diodes which causes only clipping of the excess signal and not termination. Pirc cannot be adapted for use on an ISDN eight wire network and does not provide a termination function via a positive temperature coefficient thermistor that when used with an eight wire network then eliminates modems. U.S. Pat. No. 4,772,225 to Ulery discloses a technique for producing a 25 pin RS-232 type adaptor for placing small surface mounted devices within a network to provide line filtering. While this technique could be used to provide network termination or surge protection for conventional systems, it will not work with ISDN in its present form.

U S. Pat. No. 4,758,921 to Hung discloses a plug in surge protection unit using semi-conductors and fuses for use with quick clip terminal blocks on individual telephone subscriber's lines. This device does not provide line termination needed for use with ISDN network applications.

U.S. Pat. No. 4,742,541 to Cwirzen a telecommunications interface device for connecting conventional telephone lines to the customer's equipment via individual wires or a four (4) pin modular phone plug. The device does provide surge protection for communication systems, but its form and function are not adaptable to ISDN network applications with no termination features.

U.S. Pat. No. 4,729,752 to Dawson discloses a surge protection device which provides transient protection. The form and function of this device are not compatible with ISDN network applications.

U.S. Pat. No. 7,726,638 to Farrar discloses a device for providing surge protection, through the use of diodes, for existing circuits and for retrofitting existing connectors to provide surge protection. This device is primarily for internal computer use and does not provide the type of protection necessary for use with ISDN network applications.

U.S. Pat. No. 4,475,012 to Coulmance discloses a surge protection means within a conventional telephone set using positive temperature coefficient thermistor, transistors and diodes to protect and control the circuit. The disclosure has little applicability to ISDN type applications.

U.S. Pat No. 4,438,477 to Cawley disclosed a device to protect incoming and outgoing communication lines using positive temperature coefficient thermistors, metal oxide veristors, gas tubes and alternating current wall outlets which is inapplicable to ISDN systems or applications.

Other circuit interface and adaptor designs are disclosed is U.S. Pat. Nos. 4,438,477; 4,433,212; 4,313,147; 4,225,210;and, 3,750,082. None of these disclosures are relevant to ISDN systems.

It is the principal object of this invention to provide a network termination function coincident with line fault protection in a network.

Another object of the present invention to provide transient line fault protection against overcharge/overvoltage conditions caused by EMI, ESD or EMP for eight wire ISDN systems through the use of PTC thermistors and a thermoplastic housing.

Another object of this invention is to provide a resettable protective device which automatically returns to normal operation when the fault condition is removed.

Another object of the invention is to provide a means to test the integrity of the network by allowing the supplier to check each tap in the network, without disrupting service, to determine if termination is in fact occurring under fault conditions.

Numerous other advantages and features of the invention will become readily apparent from the detailed description of the preferred embodiment of the invention, from the claims, and from the accompanying drawings, in which like numerals are employed to designate like parts throughout the same.

BRIEF DESCRIPTION OF THE FIGURES

FIG. 1(a) is a schematic diagram of a typical ISDN network configuration including the present invention.

FIG. 1(b) is a schematic diagram of terminator interface showing typical in-line application of the present invention.

FIG. 2 is a top cross-sectional view of the terminator of the present invention;

SUMMARY OF THE INVENTION

Figure 3:
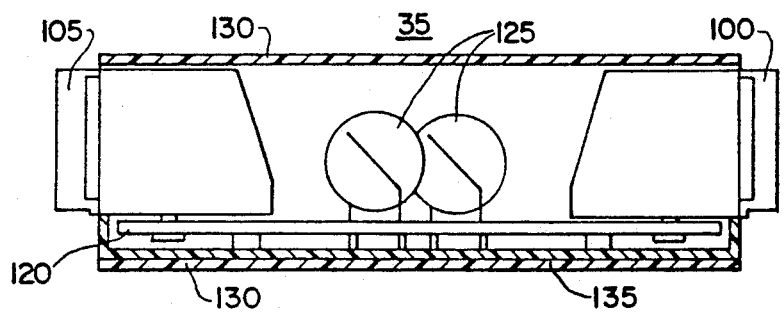
FIG. 3 is a side cross-sectional view of the terminator of the present invention.

The present invention is directed to an electrical device which provides network termination and line fault protection under overvoltage/overcharge fault conditions. This protection is provided through the use of positive temperature coefficient thermistors and a housing is electrical communication with a multiplicity of multiple connectors.

These thermistors are temperature sensitive resistors made of polycrystaline ceramic materials. The base compounds, usually, barium titanate or solid solutions of barium and strontium titanate, are high-resistivity materials which are made semi-conductive through the addition of dopants.

The thermistors provide protection from electrical current surges due to their dramatic rise in resistivity at the transient temperature. At correct current levels, the power being generated does not heat the positive temperature coefficient to its transition temperature; however, when there is an abnormally high-fault flow of current, the resistance of the positive temperature coefficient rises at a rapid rate so that further increases in power dissipation result in a reduction of current flow. When the electrical current returns to normal levels, the resistance of the positive temperature coefficient is again reduced and normal current flow resumes.

The thermistors are housed with high resistance conductive thermoplastics housing which do not require external ground wires. This housing prevents the build up a static charge as it allows the constant slow bleed off of charge to ground. This charge will be dissipated slowly preventing a high static surge.

The housing could contain two eight pin modular jacks, one at each end of the housing, to allow interconnection to the components of the network. The housing may also contain an eight pin modular jack and a four, six or eight pin wire cord, with or without a modular jack.

DESCRIPTION OF THE PREFERRED EMBODIMENT OF THE INVENTION

While the invention is susceptible of embodiment in many different forms there is shown in the drawings and will be described herein in detail, a preferred embodiment of the invention. It should be understood, however, that the present disclosure is to be considered an exemplification of the principles of the invention and is not intended to limit the spirit and scope of the invention and/or claims of the embodiment illustrated.

Prior known devices utilizing a resistor-capacitor combination as an ISDN terminating resistor are highly deficient in comparison to the present invention. Because of the frequencies involved with an ISDN network and the time constant of the resistor connector network, the capacitor is present primarily to protect the companion resistor and not to filter or to protect the network or its peripherals. The frequencies at which the ISDN system operates the signals pass right through the capacitor and that only in surge situations does the capacitor become effective in protecting the resistor from burning out.

The present invention using PTC technology is effective at bi-directionally protecting the system and its peripherals from each other in alternating and direct current situations.

The present invention is highly effective in network or peripheral fault conditions. In these fault conditions, the network is "garbled" causing both alternating and direct current overload/current situations and a wide range of frequency disturbances. In these situations, there is greater reliability that the PTC terminating resistor will offer the necessary protection and survive the fault situation.

The prime advantage of a terminator such as the present invention is to prevent reflections in the transmission line (such as 55 in FIG. 1b) at a distance greater than 33 feet from an ISDN type switching system 30 (FIG. 1a).

Shown in FIG. 1(a) a schematic diagram of a simplified short branched passive bus as used in a typical ISDN network configuration 10. Such a configuration has a peripheral side and a network with an electronic telecommunication switch being the dividing line between the two sides. Such a switch is intended to be of the type to handle ISDN communications. On the network side are depicted various computer hardware 15 which as depicted may be a personal micro-computer or even a main frame computer or any type of central processing unit type of computer system. Conventional digital handsets or telephones 20 are shown in electrical communication in series with the inventive terminating resistors (TR) 25. The ISDN network consists of the combination of computers 15, telephones 20 and in series thereto the inventive terminating resistors 25. An electronic switching system 30 is shown as part of the network application which may be American Telephone and Telegraph Model 5ESS Switch which has been specifically configured or modified to be operative or compatible with ISDN networks. On the peripherals side, or the user side as it is called, in electrical communication with switch 30 are the positive temperature coefficient thermistors or terminating resistors 35 in series to a telephone handset 40 and computer 45.

FIG. 1(b) shows a schematic diagram of a T-interface connection to ISDN network with a bulk power arrangement. The T-interface is the standard ISDN interface used by ISDN terminators as selected by the user on the peripheral side. Terminal equipment 50 requiring T-interface as found on a AT&T Model 5ESS Switch having ISDN capabilities A mounting cord 55 is connected to a multiple conductor electrical connector 60 of the 4, 6, 8 pin or any number of conductor modular type connector for use in an ISDN, telecommunication or electrical hardware type equipment. The inventive terminating resistor 125 is shown in series and in electrical communication via mounting cords 55 which are of the multiple conductor type, providing interconnection of the terminal equipment with the T-interface with power source 65 which provides the interconnection with the terminal equipment.

Shown in FIG. 2 is a top cross-sectional view of the terminators 125 of the present invention with female type connector ends 100 and 105 shown as pre-formed modules made of plastic or other conventional material and having conductors 10 and 115 which are commonly known and used in modular typ telephone connectors and are in electrical communication via hard wire or solder into a printed circuit board 120 in which positive temperature coefficient thermistors 125 or other resistivity means having sufficient termination to provide ISDN impedance match to provide acceptable signal level bi-directionally between a network system and its peripherals are mounted therein. Thermistors 125 are further described infra as far as their use and application in this novel manner. They are available from the Keystone Carbon Co. of St. Mary's, PA and as used in the preferred embodiment may be Keystone Type No. RL3810-100-110-50-PTC or others as the situation may require. The circuit board 120 is held and protected in a housing 130 which may be of anti-static type or conventional plastic.

FIG. 3 is a side cross-sectional view of terminators 25 or 35 showing housing 130 supporting modular type connectors 100 and 105 mounted on a printed circuit board 120 with thermistors 125. A foil side or solder side protector shield 135 is shown to prevent accidental shorts and damage to the circuit or wiring of the printed circuit board 120.

Figure 4:
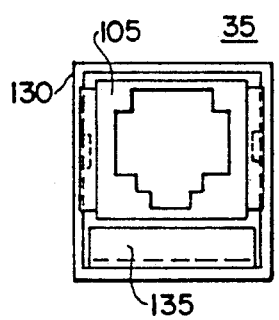
FIG. 4 is an end cross-sectional view of the terminator of the present invention.

FIG. 4 is an end view of the terminator 25/35 depicting modular type connector 105, housing 130 and shield 135.

Figure 5:
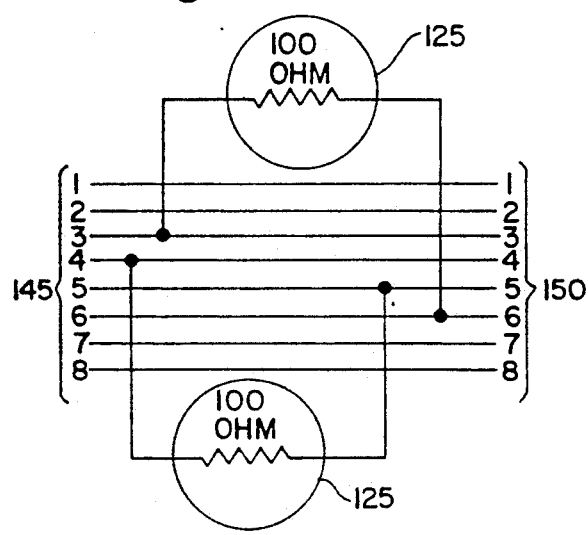
FIG. 5 is a schematic diagram of the terminating resistor function with line fault protection.
Figure 6:
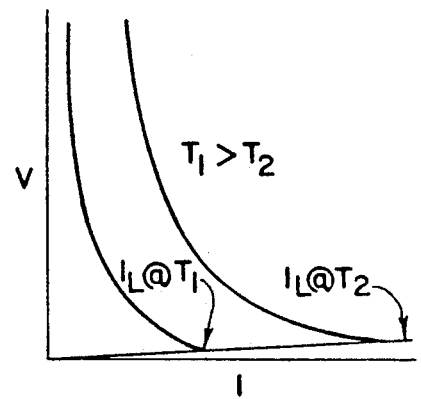
FIG. 6 is a voltage versus current graph showing the how the present invention functions as a line fault protection device or resettable fuse.

FIG. 5 is an electronic schematic wiring-contact diagram of the terminating resistor function with line fault protection. The conductor contacts 1-8 shown collectively as 145 and 105 respectively are the same electrical contacts depicted in modular connectors 100, 105. Contacts 1-8 refer to the tip-ring convention known in the telecommunication industry for connecting two telecommunications device electronically. In the present invention's environment, a user's peripherals would be connected to connector 100 and connector 105 to a cable or connector which is connected to the ISDN network or if desired, vice versa. 100 ohm termination resistance thermistors 125 are shown as jumpers across various contacts in order to provide both network termination and line fault protection bi-directionally to and from devices connected to the contacts of either/both 145 or 150 when currents which are being passed through the specific contacts from 145 to 150 at overvoltage/overcharge fault conditions. It is understood that such overfault/overcharge conditions may vary per application and that the present invention is intended and claimed to cover all such applications. A thermistor 125 having a resistivity value of 100 ohms are depicted in FIG. 5 as being in parallel over contacts 3 and 6 and 4 and 5, obviously, the present invention would be likewise operable if utilized over other useful combinations of conductors. In FIG. 6, the AT&T Model 5ESS electronic switch (like switch 30 in FIG. 1a) has thermistors 125 across pin 3 which is known as transmit plus and pin 6 which is known as transmit minus. Another thermistor 125 is positioned across pin 4 which is receive plus and pin 5 which is receive negative. Obviously, different switches may have their own pin or conduct convention in which the thermistors would be positioned in electrical communication.

FIG. 6 is a voltage ("V") versus current ("I") graph showing how the terminator of the present invention functions as a resettable fuse for line fault protection applications as a function of the temperature (T) resulting from the fault. The dramatic rise in resistance of a thermistor 125 (as shown in FIGS. 2 and 3) at the transition temperature makes it an ideal candidate for current limiting applications in protecting various components and the network in an ISDN environment For currents (I) below the limiting current $I_L$, the power being generated in the thermistor 125 is insufficient to heat the thermistor 125 to its transition temperature. However, when abnormally high-fault currents flow, the resistance of the thermistor increases at such a rapid rate that any further increase in power dissipation results in a reduction in current. The positive temperature coefficient thermistor or thermally sensitive resistor or resistive means with current sensitive switching means 125 will open the electrical connection or communication when a specific current level exceeds a desired level or amount, i.e. a level which could or would damage the network's or peripheral's hardware. The resistivity of thermistor 125 should be sufficient termination to provide ISDN system impedance match to provide acceptable signal levels bi-directionally between the network and its peripherals.

The voltage (V) versus current (I) curve in FIG. 6 shows the thermistor's 125 ability to operate as a resettable fuse. To assure that the thermistor 125 will limit current under fault conditions but will not limit current under normal conditions, the thermistor 125 should be selected with the highest and lowest current levels in mind with the amount of time it takes the thermistor to switch after subjected to a fault current. In the preferred embodiment a thermistor 125 of 100 ohm terminating resistivity having the following technical characteristics under the following operating conditions should be utilized: operating voltage 200 VRMS or 1 volts DC; no load resistance at 25° C. 100 ohms $+/-5\%$; Minimum Limiting Current: at 0° C., 0.09 amps, at 20° C., 0.08 amps; Maximum Limiting Current at 30°, 0.06 amps at 55° C. is 0.04 amps. Obviously, the thermistor 125 must be pre-selected per the application to open or close automatically upon the existence of pre-determined current limits.

Figure 7:
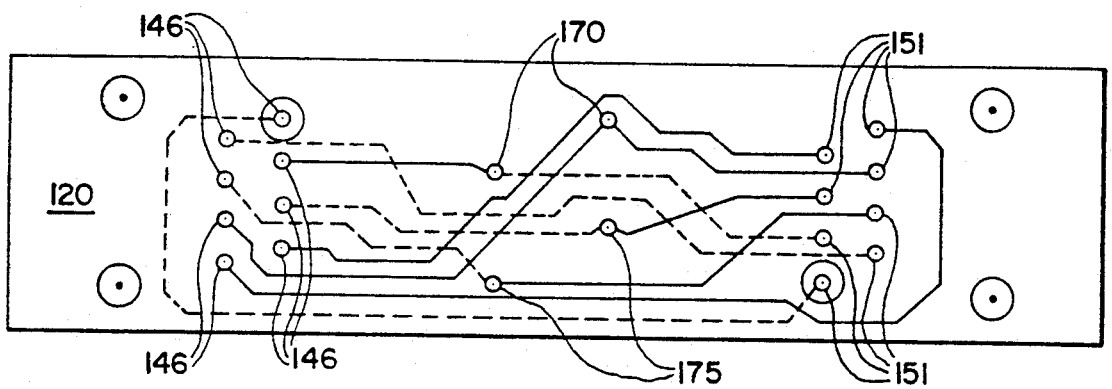
FIG. 7 is bottom side view of the printed wiring board.
Figure 8:
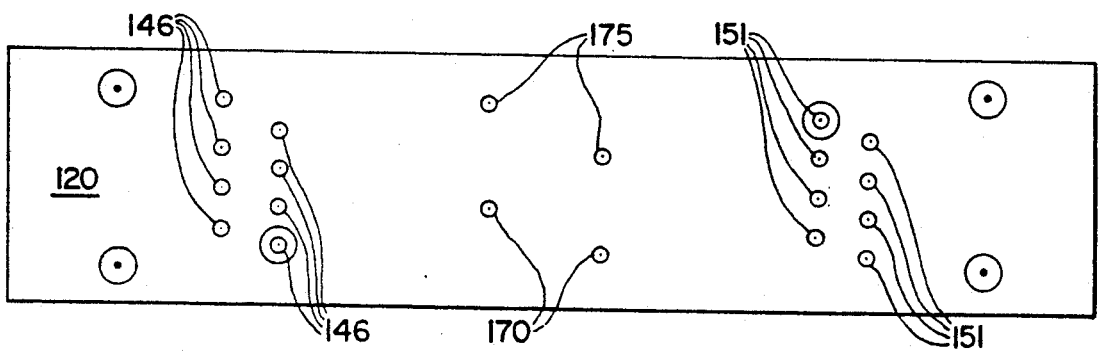
FIG. 8 is a top side view of the printed wiring board.

FIGS. 7 and 8 are top and bottom plan views of the printed circuit board 120 in which components as shown in FIGS. 2-4 are mounted therein. Conductor contacts 145, 150 (as shown in FIG. 5) are positioned into printed circuit board contacts 146 and 151 respectively as shown in FIGS. 7 and 8. Contacts 146, 151 on the printed circuit board refer to the pin outs 1-8 shown in FIG. 5. Thermistors 125 contacts are insertable into the printed circuit board contacts 170 and 175.

Figure 9:
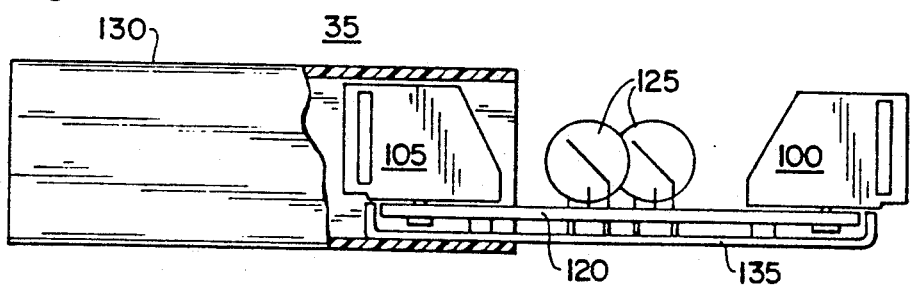
FIG. 9 is a cutaway side view of the present invention.

FIG. 9 is a partial cut away side view of the present invention terminator 25/35 as it is assembled for use. Housing 130 shown partially slidably asserted over the assembly comprising modular connector 105 mounted on printed circuit board 120, thermistors 125, modular connector 100 with protective shield 135 shown underlying board 120.

The operation of the present invention is simply and effectively described as follows. Thermistor 125 which are known as positive temperature coefficient (PTC) resettable fuses are used across electrical conducting communicating lines between ISDN networks and a peripheral such as a handset, computer or other device. The use of a PTC terminator protects the network and its devices from over current conditions by failing open and afford not only protection but also allowing diagnostic equipment to track the fault without disruption to the entire network. The use of thermistors 125 are in normal current conditions invisible to the network and its users. The use of such a thermistor is further self or auto resettable once acceptable (to the equipment hardware in electrical communication thereto) current or signal levels are returned.

The present invention is intended to be configured for use with female modular type 8 conductor connectors shown in FIG. 2 and electrically shown in FIG. 5 but other configurations with mounting cords 55 and male connections or female connector having multiple connectors are equally operative depending on the specific operation.

The foregoing specification describes only the preferred embodiment of the invention as shown. Other embodiments besides may be articulated as well. The terms and expressions therefore serve only to describe the invention by example only and not to limit the invention. It is expected that others will perceive differences which while differing from the foregoing, do not depart from the spirit and scope of the invention herein described and claimed.

What is claimed:

1. A device used between an integrated services digital network system and its associated peripheral comprising:
   first electrical connector means being a first end and a second end, said first end in electrical communication with a integrated services digital network;
   positive temperature coefficient thermistor means having a first end and a second end, said first end of said thermistor means is in electrical communication with said second end of said first connector means; and
   second electrical connector means having a first end and a second end, said first end is in electrical communication with said second end of said thermistor means and said second end of said second connector means is in electrical communication with peripheral of a integrated services digital network, said thermistor means preserves the termination function for diagnostic purposes.

2. The device of claim 1 wherein said thermistor means provides electrical energy surge protection between the integrated systems digital network system and the associated peripheral.

3. An integrated services digital network terminator in electrical communication between an ISDN Network and in electrical communication with an associated ISDN Network peripheral apparatus, comprising:
   at least one positive temperature coefficient thermistor each having two terminal end means, one terminal end means in electrical communication with the ISDN Network and a second terminal end means in electrical communication with the associated ISDN Network peripheral;
   said at least one positive temperature coefficient thermistor preserves the termination function between the ISDN Network and the ISDN Network peripheral in fault and no fault conditions.

4. The terminator of claim 3 wherein said at least one positive temperature coefficient thermistor provides electrical energy surge protection between the integrated systems digital network and the associated peripheral.

5. The terminator of claim 4 wherein said electrical energy surge protection is bi-directional protection to the network and the peripheral by limiting current between the network and the peripheral.

6. An integrated services digital network terminator in electrical communication between an ISDN Network and in electrical communication with an associated ISDN Network peripheral apparatus, comprising:
at least one positive temperature coefficient thermistor each having two terminal end means, one terminal end means in electrical communication with the ISDN Network and a second terminal end means in electrical communication with the associated ISDN Network peripheral;
said at least one positive temperature coefficient thermistor performs as a current sensitive switch means, such that when the current level between the network and associated peripheral exceeds a desired amount, said at least one positive temperature coefficient thermistor will open the electrical communication between the network and the peripheral while preserving the termination function between the network and the peripheral in fault and no fault condition.

7. The terminator of claim 6 wherein said positive temperature coefficient thermistor acting as a current sensitive switch means is closed automatically upon the existence of predetermined current limits.

8. The terminator of claim 6 wherein said current sensitive switch will open whenever said current level exceeds a desired amount in a bi-directional direction of energy flow.

9. The terminator of claim 6 wherein said at least one positive temperature coefficient thermistor provides a predetermined impedance termination function between the network and peripheral.

10. A method of preserving the termination function in fault and no-fault conditions in the electrical communication between an ISDN Network and an associated ISDN Network peripheral apparatus, comprising the step of:
connecting at least one positive temperature coefficient thermistor in electrical communication between the ISDN Network and an associated ISDN Network peripheral apparatus to preserve the termination function between the ISDN Network and the associated ISDN Network peripheral in fault and no fault conditions.

11. A device used in an integrated services digital network system having the ability to provide in-line protection to the ISDN Network and its peripherals and positioned in-line and between the network and its peripherals comprising:
resistivity means for sufficient termination to provide integrated services digital network system impedance match to provide acceptable signal level bi-directionally between the network and its peripherals;
current sensitive switch means for mutual protection from internally or externally induced errant signals between the network and its peripherals.

12. The device in claim 11 wherein said current sensitive switch means is automatically reset upon pre-determined current limits.

13. The device in claim 12 wherein said current sensitive switch means becomes an open circuit upon exceeding predetermined current limits.

* * * * *